United States Patent
David et al.

(10) Patent No.: US 6,536,465 B2
(45) Date of Patent: Mar. 25, 2003

(54) FILLING LIMITOR FOR SMALL, SHALLOW LIQUID STORAGE TANKS

(75) Inventors: Donald R. David, Raytown, MO (US); Francis L. Miller, Lee's Summit, MO (US); Ronald W. Borst, Kansas City, MO (US)

(73) Assignee: Clay and Bailey Manufacturing Company, Kansas City, MO (US)

( * ) Notice: Subject to any disclaimer, the term of this patent is extended or adjusted under 35 U.S.C. 154(b) by 40 days.

(21) Appl. No.: 09/834,150

(22) Filed: Apr. 12, 2001

(65) Prior Publication Data

US 2002/0148505 A1 Oct. 17, 2002

(51) Int. Cl.⁷ ............................................... F16K 31/26
(52) U.S. Cl. ..................... 137/442; 137/436; 141/198
(58) Field of Search ................... 137/409, 434, 137/436, 437, 442; 141/198

(56) References Cited

U.S. PATENT DOCUMENTS

| | | | |
|---|---|---|---|
| 2,751,877 A | 6/1956 | Boone et al. | |
| 3,625,264 A | * 12/1971 | Swain | 141/198 |
| 4,064,907 A | * 12/1977 | Billington et al. | 137/446 X |
| 4,667,711 A | 5/1987 | Draft | |
| 4,986,320 A | 1/1991 | Kesterman et al. | |
| RE33,555 E | 3/1991 | Draft | |
| 5,235,999 A | 8/1993 | Lindquist et al. | |
| 5,472,012 A | * 12/1995 | Wood et al. | 137/416 |
| 5,564,465 A | 10/1996 | Pettesch | |
| 5,603,364 A | 2/1997 | Kerssies | |
| 5,655,565 A | 8/1997 | Phillips et al. | |
| 5,775,842 A | 7/1998 | Osborne | |
| 5,839,465 A | 11/1998 | Phillips et al. | |
| 6,076,546 A | * 6/2000 | Waters | 137/442 X |

* cited by examiner

Primary Examiner—Kevin Lee
(74) Attorney, Agent, or Firm—Hovey Williams LLP

(57) ABSTRACT

The limitor includes a tubular valve body that houses a poppet valve axially moveable between opened and closed positions by an external float. The poppet is protected from direct engagement with incoming pressurized liquid by an overhead deflector that diverts incoming liquid radially outwardly into an annular region around the deflector so that the liquid can pass through a port underlying and spaced below the poppet. This prevents premature closing of the valve. Preferably, the limitor is constructed from a main support tube that becomes attached to the tank and a valve subassembly that is threadably joined with the tube and projects down into the interior of the tank during use. Alternative embodiments are disclosed, including drop tube versions, for facilitating initial installation of the limitor on the top wall of a tank.

10 Claims, 8 Drawing Sheets

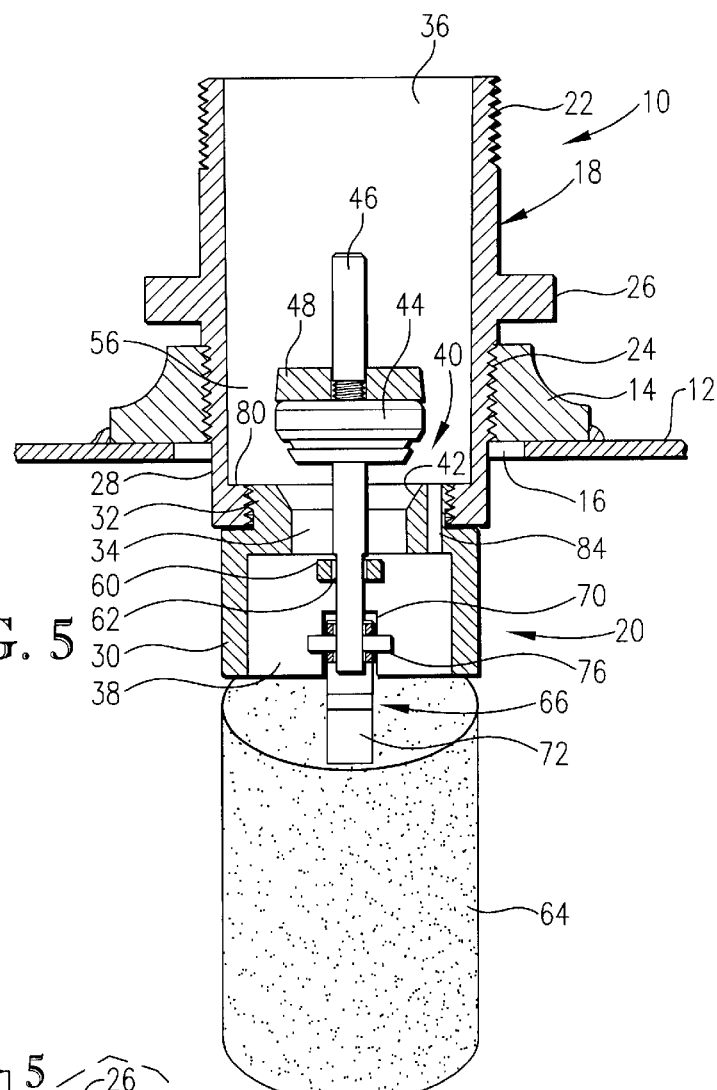
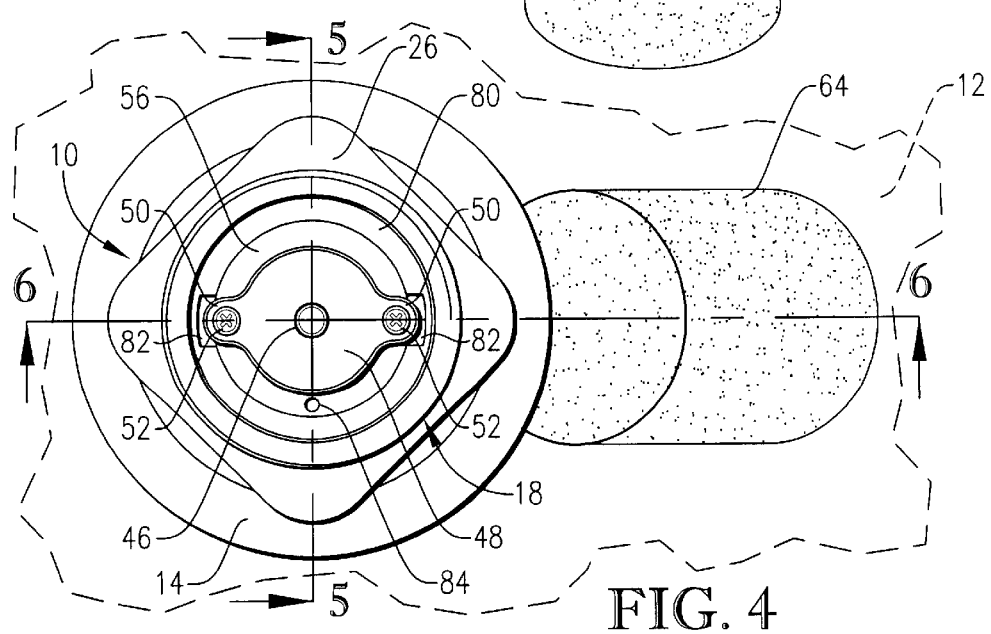

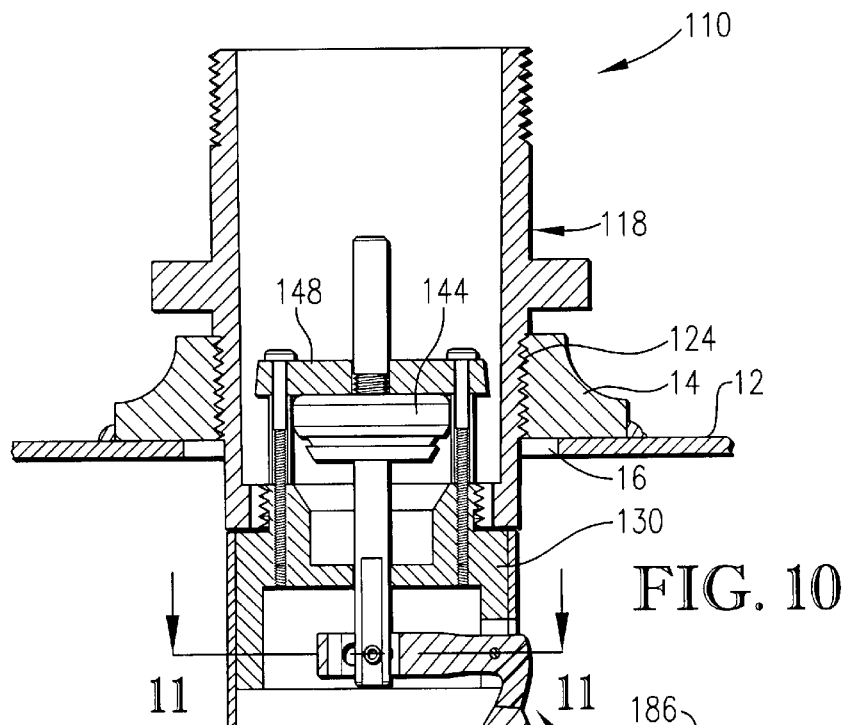
FIG. 10
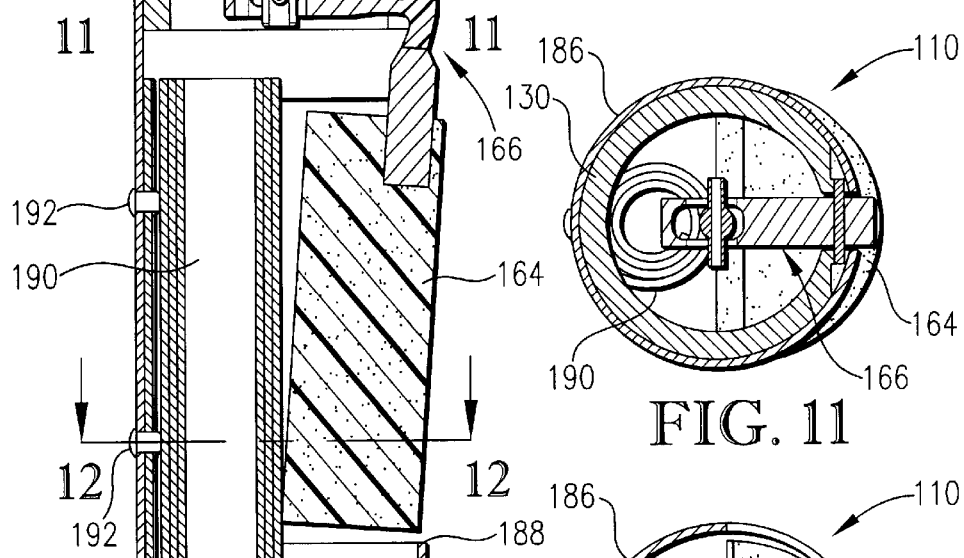
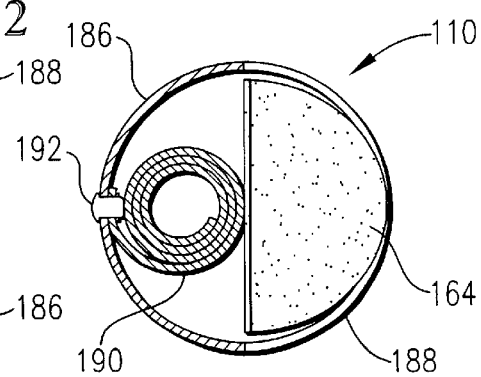
FIG. 11
FIG. 12

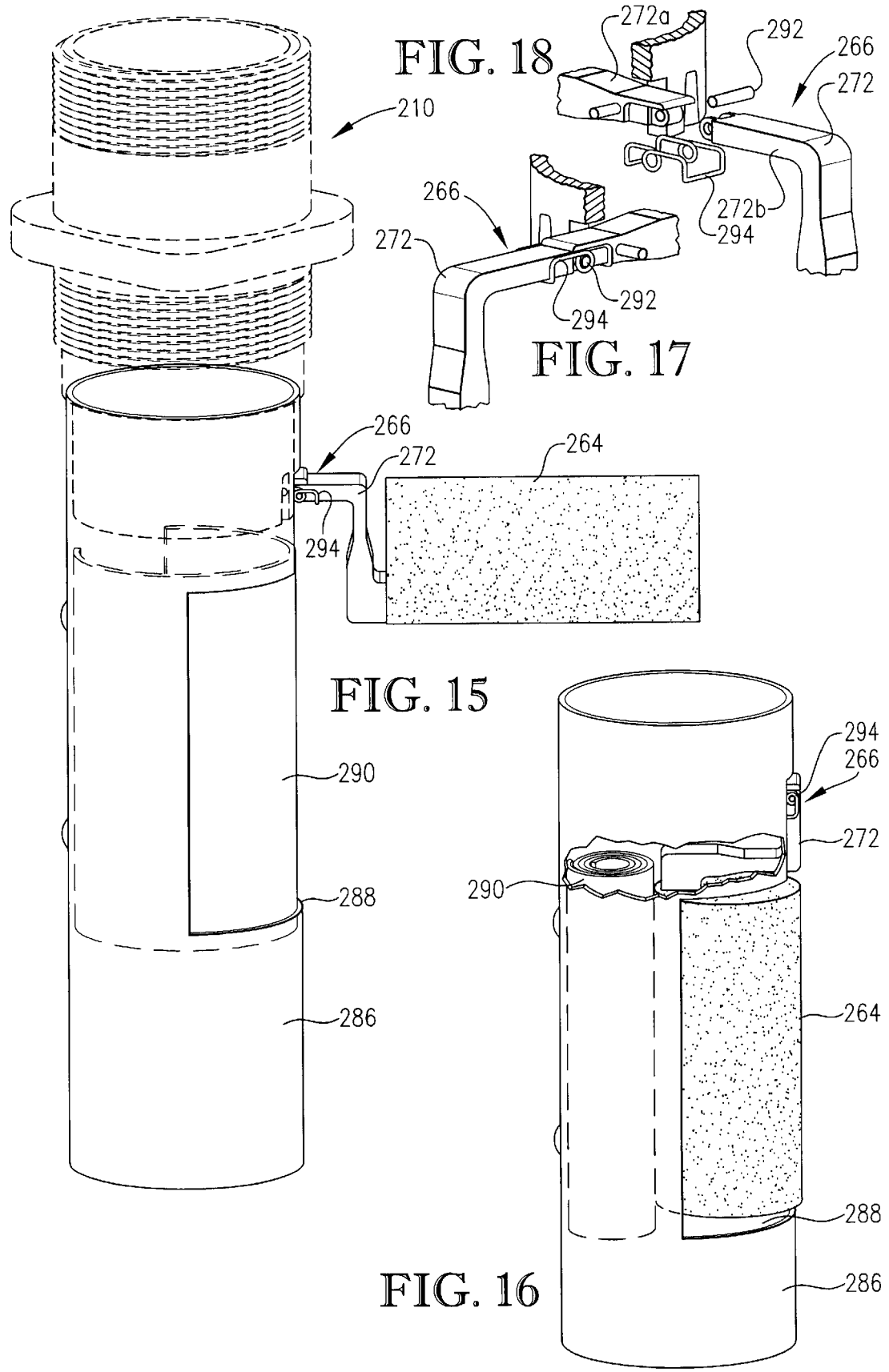

FILLING LIMITOR FOR SMALL, SHALLOW LIQUID STORAGE TANKS

TECHNICAL FIELD

The present invention relates to the field of overfill protection devices or filling limitors for liquid storage tanks and, more particularly, to devices of the foregoing type that are especially suited for shallow tanks such as those known as "generator day tanks" used to store fuel for backup generators at hospitals and the like, or those found in or around homes to hold fuel oil for home heating.

BACKGROUND

Day tanks and home fuel oil tanks and the like are typically refilled by supply trucks that travel to the site and connect a hose from the truck to an inlet tube on the top wall of the tank. The hose is connected to the inlet tube in a sealed manner, and a pump on the truck delivers the fuel through the hose and into the tank under pressure. The tank typically has a vent that allows air to escape as the liquid level within the tank rises. Thus, although the supply line from the trunk to the tank is a sealed path, it is possible that the tank can become overfilled to such an extent that fuel spills out through the vent if the operator is not particularly attentive or if automatic shut-off mechanism at the truck fails to function properly.

Accordingly, there is a need for a way of shutting off additional inflow of fuel to the tank to prevent accidental overfilling and spillage, notwithstanding the presence of other shut-off mechanisms associated with the supply apparatus. While various types of electro-mechanical devices of this type are currently available, they suffer from numerous disadvantages, including cost and complexity.

SUMMARY OF THE INVENTION

The present invention provides a filling limitor or overfill protection device that is relatively simple, yet highly effective. It can be readily retro-fitted to existing tanks and is safe and reliable in operation. It is particularly well suited for shallow tanks in which the distance between the top and bottom walls of the tank is relative short, for example three feet or less. Although disposed within the flow path of incoming liquid, the valve of the device is capable of successfully resisting any tendency for the pressurized liquid to close the valve prematurely, which would result in only partial filling of the tank.

In one preferred embodiment of the present invention a poppet valve is housed within a tubular valve body and is moveable axially between open and closed positions by an external float that is operably coupled with the valve. Although the poppet is located within the tubular valve body that defines the flow path, the poppet is protected from direct engagement with the incoming pressurized liquid by an overhead deflector that is axially aligned with the poppet. Fluid that would otherwise engage the poppet and force it down against its seat to prematurely close the port through the valve body is instead diverted out radially upon engagement with the deflector so as to enter an annular region around the deflector and pass to and through the port without impinging the poppet. Consequently, the poppet is only shifted to its closed position when the float intentionally moves it to such position in response to the liquid within the tank reaching a predetermined level.

In a preferred embodiment the limitor comprises an assembly having as its two main components a mounting tube that is adapted to be threadably attached to the top wall of the tank and a valve subassembly that is threadably attached to the mounting tube. The subassembly comprises a cylinder having an annular, externally threaded boss at its upper end that is threadably received by the internally threaded lower end of the mounting tube. The cylinder defines an inlet port which is opened and closed by a poppet operating above the port along an axial path of travel relative thereto. The poppet has a valve stem associated therewith projecting above and below the poppet so as to be guided in its reciprocal travel by upper and lower guide structure supported by the cylinder. The upper guide structure serves also as a deflector overlying the poppet to divert liquid flow away from the poppet. At its lower end, the valve stem is mechanically coupled with an operating arm of the float which is supported laterally outside of the cylinder, such arm being swingable up and down by the rising and falling level of liquid within the tank to correspondingly manipulate the valve stem.

Various alternative embodiments are disclosed, including embodiments that utilize a drop tube extending down from the valve body for use in tanks that are not as shallow or where the incoming liquid is preferably delivered close to the bottom of the tank to avoid splashing or turbulence. The drop tube embodiments contemplate the provision of an opening in a sidewall of the drop tube that is sized to accept the float when the float is swung down and moved into the opening to present a slender profile for inserting the assembly through the hole in the top wall of the tank during installation. The opening in the sidewall is covered by an internally disposed cover that is spring biased toward the opening yet can be yieldably pushed into the interior of the drop tube by the float as the float enters the opening from outside the drop tube. The float arm is so designed in such embodiments that it can resiliently flex to a position permitting the float to be swung beyond its normal limit of travel into the inside of the drop tube, or the arm is of two-part, spring loaded construction to provide the desired amount of relief to permit the movement of the float to its installation position.

BRIEF DESCRIPTION OF THE DRAWINGS

FIG. 3 is an assembled isometric view of the limitor with parts broken away to reveal internal details;

FIG. 4 is a top plan view of the limitor installed on the tank;

FIG. 5 is a vertical cross sectional view through the installed limitor taken substantially along line 5—5 of FIG. 4 and showing the poppet of the valve in its open position;

FIG. 10 is a fragmentary vertical cross sectional view of the installed embodiment of FIGS. 8 and 9 illustrating the float forced inside the opening and the side of the drop tube for installation purposes;

FIG. 11 is a horizontal cross sectional view thereof taken substantially along line 11—11 of FIG. 10;

FIG. 12 is a horizontal cross sectional view there of taken substantially along line 12—12 of FIG. 10;

FIG. 15 is an isometric view of another drop tube embodiment wherein the operating arm of the float is jointed to provide the necessary over travel of the float for installation purposes;

FIG. 16 is an isolated view of the drop tube separate from the valve components of the limitor illustrating the way in which the float moves into the interior of the drop tube during its over travel for installation purposes;

FIG. 17 is an enlarged, fragmentary isometric view of the jointed operating arm of the float; and FIG. 18 is an fragmentary, exploded isometric view of the operating arm of the float.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
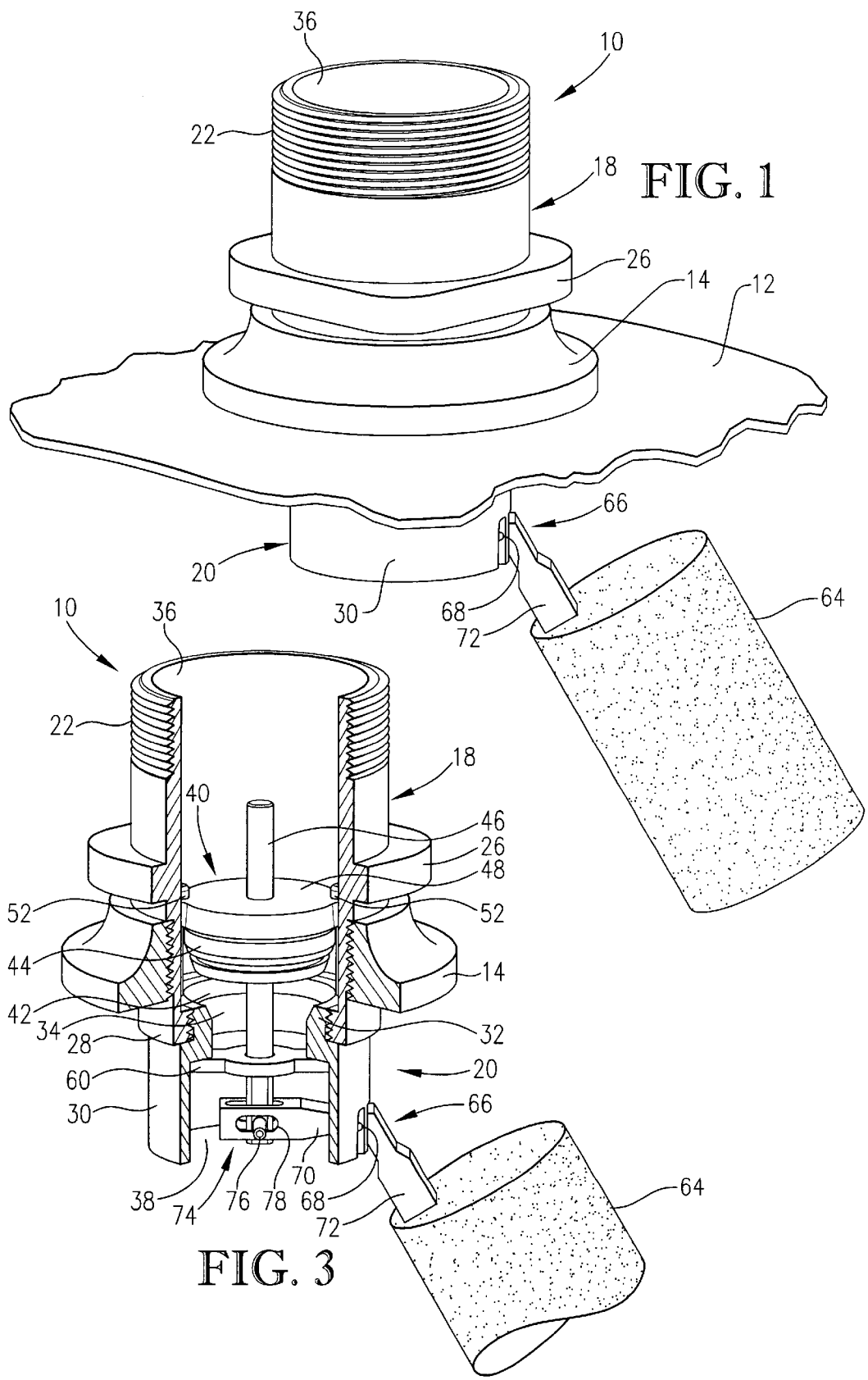
FIG. 1 is a fragmentary isometric view of a limitor constructed in accordance with the principles of the present invention and installed on the top wall of a storage tank.
Figure 2:
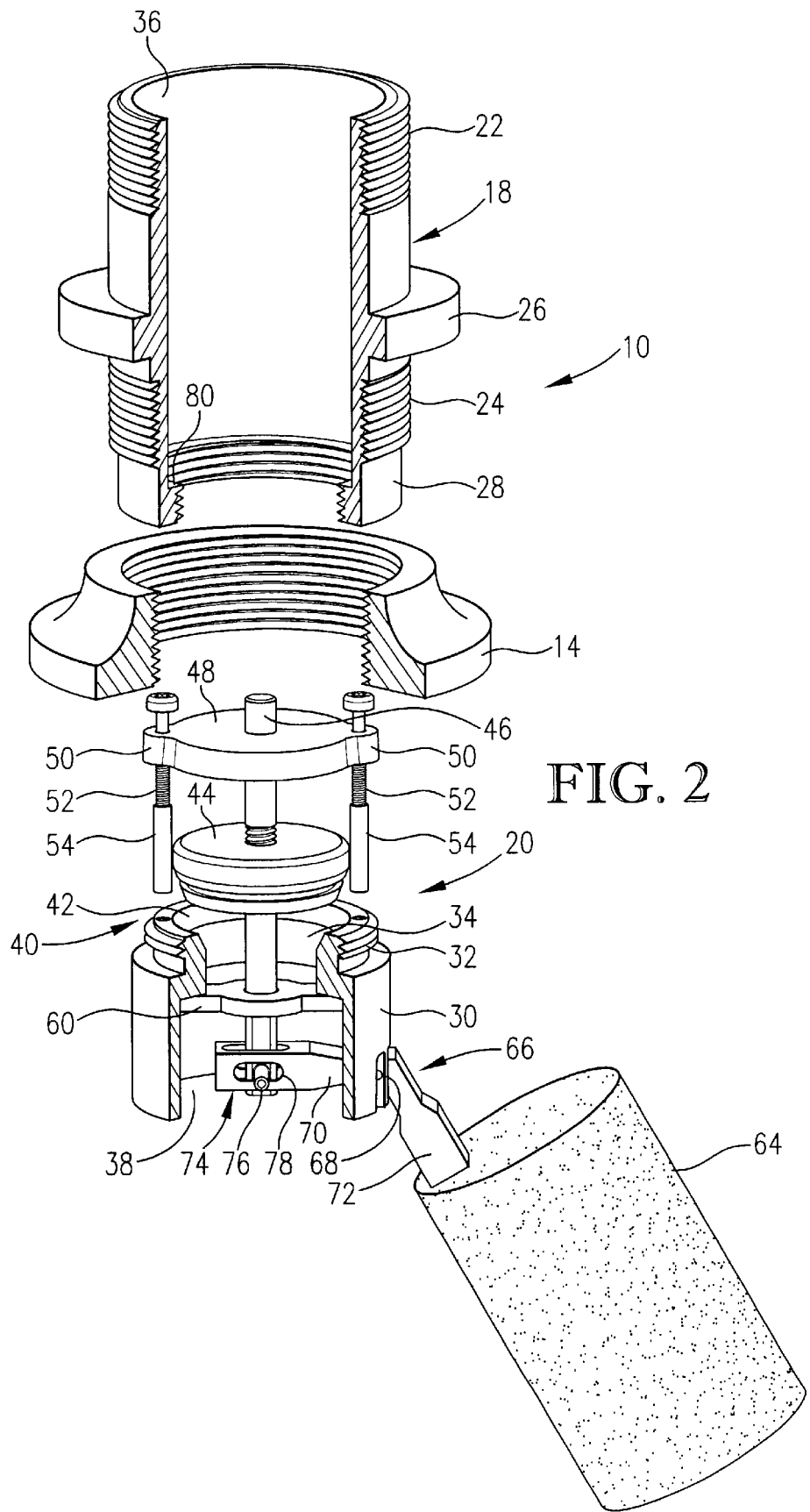
FIG. 2 is an exploded isometric view of the limitor with parts broken away to reveal details of construction.

The limitor 10 as illustrated in FIG. 1 is mounted on the top wall 12 of a liquid storage tank. An annular flange 14 is welded to top wall 12 so as to be a permanent part of the tank and is axially aligned with a hole 16 in wall 12 as illustrated, for example, in FIG. 5. The limitor 10 preferably is constructed to comprise two major components, i.e., a support tube 18 that becomes secured to flange 14, and a valve subassembly 20 that becomes secured to and supported by tube 18 in use.

Support tube 18 has a series of upper external threads 22 at its upper end that are adapted to mesh with the internal threads of a coupling (not shown) on the end of a supply hose from a source of liquid such as, for example, a fuel truck. Generally adjacent its lower end, the tube 18 is provided with a lower set of external threads 24 that permit the tube 18 to be screwed into flange 14 and to project partially downwardly through the hole 16 in top wall 12. A collar 26 around the exterior of tube 18 intermediate its opposite ends is provided with a series of wrench flats that facilitate screwing the tube 18 down into flange 14 during installation. A slightly reduced diameter lower portion 28 of tube 18 permits insertion of the latter down into and through flange 14.

The valve subassembly 20 is adapted to be assembled to the tube 18 prior to installation of limitor 10 on the tank and includes a cylinder 30 having a reduced diameter, annular boss 32 at its upper end. Boss 32 is externally threaded so as to be threadably engaged with mating internal threads on the reduced diameter portion 28 of tube 18 when cylinder 30 is screwed up into tube 18. A port 34 is provided within the boss 32 so as to communicate a tubular passage 36 of the tube 18 with a tubular passage 38 of the cylinder 30. A poppet valve, denoted generally by the numeral 40, is provided to open and close port 34.

Figures 6, 7:
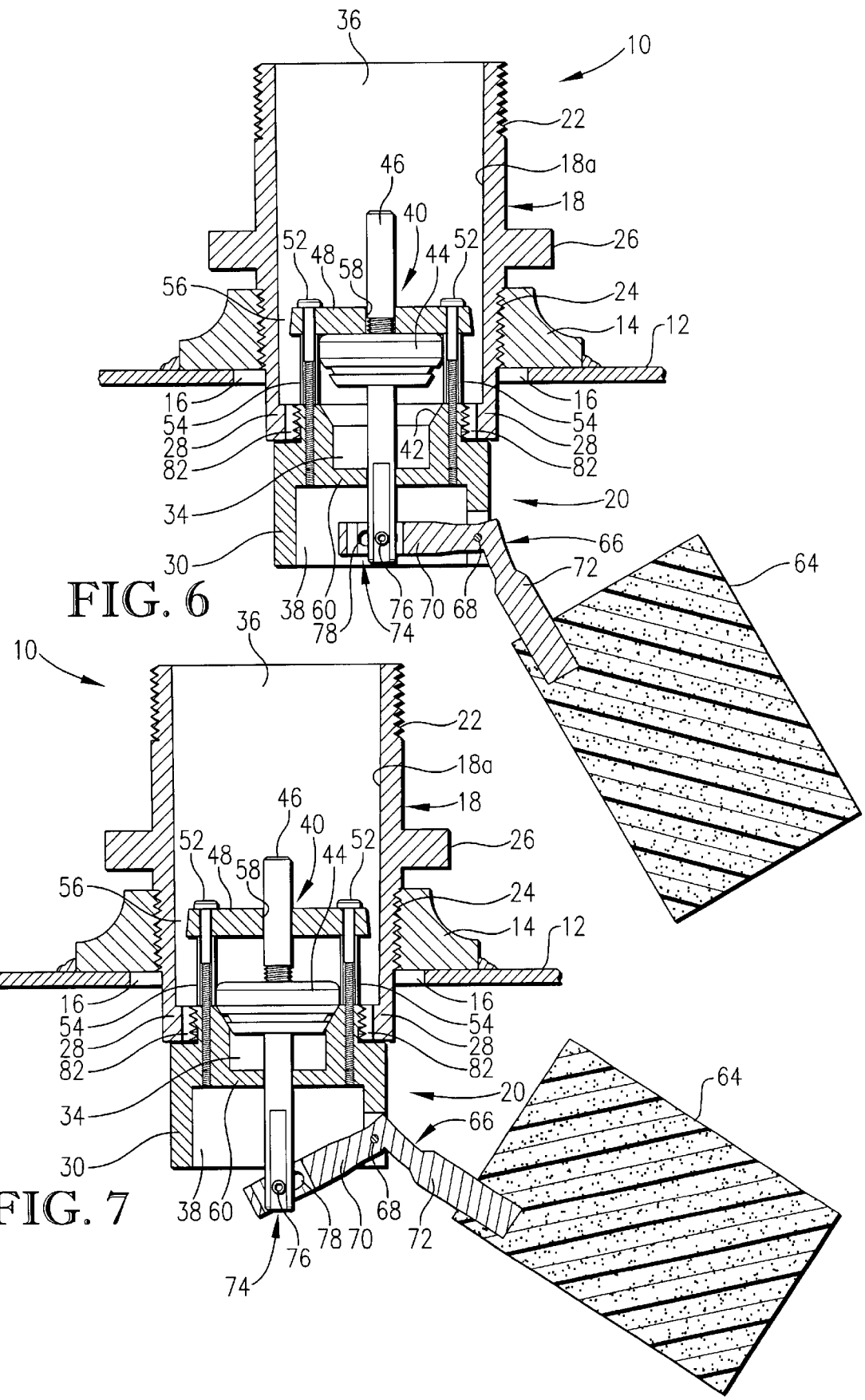
FIG. 6 is a vertical cross sectional view of the installed limitor taken substantially along line 6—6 of FIG. 4 with the poppet in its open position.
FIG. 7 is a vertical cross sectional view of the limitor similar to FIG. 6 but showing the poppet in its closed position.
Figure 8:
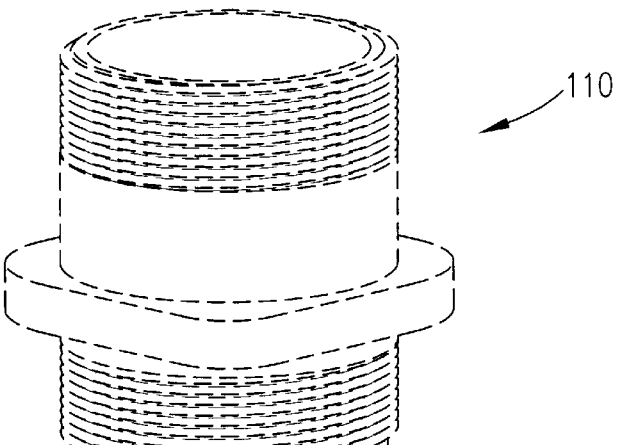
FIG. 8 is an isometric view of an alternative embodiment which utilizes a drop tube.
Figure 9:
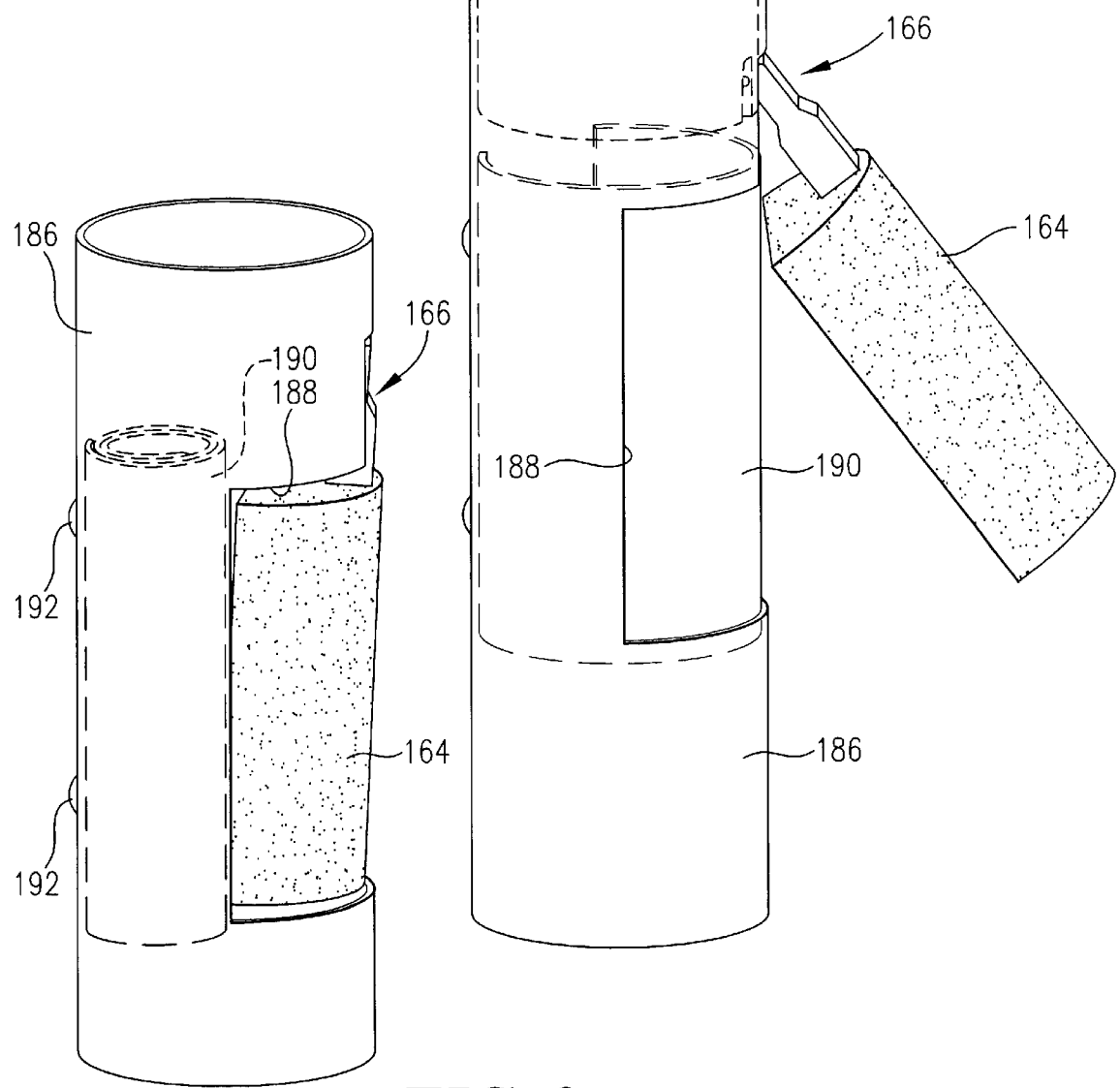
FIG. 9 is an isometric view of the drop tube separately from the valve components of the limitor illustrating the manner in which the float maybe swung down into the interior of the drop tube for ease of installation.

Poppet valve 40 includes an annular, beveled seat 42 that generally circumscribes port 34 at the upper end of boss 32. A disk-like poppet 44 comprises another part of valve 40 and is carried by cylinder 30 for reciprocation between a closed position as shown in FIG. 7 in which poppet 44 sealingly engages seat 42 and an open position as shown, for example, in FIGS. 5 and 6 wherein poppet 44 is spaced axially above seat 42. A valve stem 46 has an upper portion projecting upwardly beyond poppet 44 and a lower portion projecting downwardly from poppet 44 in coaxial alignment with port 34 and passages 36,38.

A generally circular deflector 48 is disposed above poppet 44 in axial registration therewith. Deflector 48 is generally the same diameter as the poppet 44 except that, as shown particularly in FIG. 4, defector 48 has a pair of diametrically opposed ears 50 that project a short distance outwardly beyond the otherwise circular profile of deflector 48. Ears 50 are provided with through holes that receive corresponding mounting screws 52 that are threaded down into boss 32. A pair of tubular support members 54 are disposed between ears 50 and boss 32 so as to effectively space deflector 48 a fixed distance above port 34, and such support members 54 freely receive the screws 52 so that members 54 are effectively clamped between deflector 48 and boss 32. The outermost circumferential edge of deflector 48 is spaced radially inwardly from the interior wall surface 18a of tube 18 so as to define an annular flow region 56 through which incoming liquid may pass in order to reach port 34.

The deflector 48 is provided with a centrally disposed guide hole 58 that reciprocally receives the upper end of valve stem 46. Thus, deflector 48 serves the dual purposes of deflecting incoming liquid away from poppet 44 and guiding stem 46 during its reciprocation. At the other extreme, a transverse guide bar 60 spans the passage 38 just below port 34 to serve as a guide for the lower end of valve stem 46, the bar 60 having a central guide hole 62 that reciprocally receives the lower end of stem 56.

The valve subassembly 20 further includes a float 64 for operating poppet 44. A generally L-shaped operating arm 66 is pivotally mounted on the cylinder 30 via a horizontally disposed pin 68 so that one leg 70 of arm 66 projects into the passage 38 while another leg 72 projects outwardly beyond the exterior of the cylinder 30. Inner leg 70 is operably connected to the lower end of stem 46 via a pin and slot connection 74, there being a transverse pin 76 in stem 46 that is received within an elongated slot 78 in leg 70. Float 64 is cylindrical, and the outer leg 72 of arm 66 is fixed thereto at a location that is radially offset from the longitudinal axis of float 64, the offset being such that the majority of the mass of float 64 is disposed outboard of leg 72.

It will be noted that float 64 has an outer diameter that is less than the inside diameter of flange 14. This facilitates field installation of limitor 10 as will be explained hereinbelow. In addition, it is to be noted that float 64 is supported on cylinder 30 at a point spaced a significant distance below the lower set of external threads 24 on tube 18, which also facilitates installation of limitor 10 as explained below. The offset of float 64 with respect to the longitudinal axis of leg 72 of arm 66 is also important and beneficial for installation purposes.

It will be seen that the lower reduced diameter portion 28 of tube 18 is configured to present an internal, annular ledge 80. This ledge has an inside diameter that is less than the distance between the outermost edges of the ears 50 of deflector 48, as shown in FIG. 4. To permit insertion of deflector 48 and its associated componentry up into the bottom end of tube 18 during assembly notwithstanding this over width dimension of deflector 48 from ear-to-ear, ledge 80 is provided with a pair of clearance notches 82 (FIGS. 4, 6 and 7) that are diametrically opposed to one another to clear corresponding ones of the ears 50 during initial insertion of the valve subassembly 20 up into the lower end of tube 18. Once ears 50 have passed upwardly through and beyond notches 82, they are no longer in interfering relationship with ledge 80 such that boss 32 can be screwed into the internal threads at the bottom of tube 18. As particularly shown in FIGS. 4 and 5, boss 32 is provided with a drain hole 84 that maintains constant communication between passages 36 and 38 even when valve 40 is closed.

It will be appreciated that when support tube 18 and valve subassembly 20 are assembled together to make a complete limitor assembly 10, tube 18 and cylinder 20 effectively become a single elongated tubular valve body that presents an internal flow passage comprised of the port 34, the upper passage 36 and the lower passage 38. Thus, although in the above described embodiment such body is defined and presented by two separate major components, it is within the scope of the present invention for the body to be integrally formed and of one piece construction. The operating principles remain the same in both cases, as explained below.

Operation

The installed limitor 10 is normally provided with a suitable closure cap (not shown) threaded onto the upper end of tube 18 via threads 22. Such cap obviously needs to be removed at the time the tank is to be refilled with fuel or other liquid as appropriate. Once the closure cap has been unscrewed from tube 18 and the supply hose connected in its place, a sealed delivery path from the transport truck to the tank is established and refilling may begin.

FIGS. 1–6 illustrate valve 40 in its open condition in which the weight of float 64 has rotated operating arm 66 downwardly and shifted stem 46 upwardly until poppet 44 has engaged the bottom side of deflector 48. Thus, in addition to its functions as an incoming liquid deflector and a guide for reciprocal stem 46, the deflector 48 also serves as a limit stop for poppet 44 at the fully opened position of valve 40.

With poppet 44 up against the underside of the deflector 48, pressurized or non-pressurized liquid is free to move through limitor 10 and into the interior of the tank in a free-flowing manner. It will be noted that as the incoming liquid rushes down through passage 36 of support tube 18, the central portion of such flowage encounters the deflector 48 and is diverted into annular flow region 56 around the periphery of the deflector. The entire mass of liquid then moves through region 56 and through the open port 34 before traveling into the passage 38 of cylinder 30 and discharging into the tank. Due to the presence of the overhead deflector 48, the inrushing liquid does not impinge the top of poppet 44 on its way to and through port 34. Instead, it merely rushes harmlessly through region 56 around the sides of poppet 44 without pushing down on poppet 44 in an effort to prematurely close it against seat 42. On the other hand, it will be noted that float 64 is offset well to the side of discharging liquid from the lower end of cylinder 30 such that there is no tendency for the liquid to impede the operation of float 64 in any way.

As the liquid level rises in the tank, it engages float 64, and eventually the buoyancy of float 64 causes it to float upwardly, rocking operating arm 66 in a counterclockwise direction viewing FIG. 6 so as to pull downwardly on valve stem 46 and cause poppet 44 to engage seat 42, closing port 34. This condition is illustrated in FIG. 7 wherein poppet 44 is fully seated against seat 42. At that point, no further flow of liquid through port 34 can occur, although drain hole 84 as illustrated in FIGS. 4 and 5 permits liquid that is upstream from valve 40 within tube 18 and the supply hose to drain slowly into the tank. Typically, when valve 40 closes, a back pressure will develop within the supply hose sufficient to trip shut-off mechanism at the truck to disable the pump and terminate further delivery of liquid to the tank. Obviously, other means may be utilized to terminate further delivery, particularly in instances where limitor 10 is utilized for other applications that the home delivery of fuel oil.

Initial installation of the limitor on the tank can be quickly and easily effected. Even though the total width of limitor 10 from the outer lateral extremity of the float 64 to the far side of tube 18 and cylinder 30 exceeds the diameter of hole 16 and the internal diameter of flange 14, the arrangement of components and other dimensions of limitor 10 are such that limitor 10 can still be installed through flange 14 and hole 16. As noted earlier, the diameter of float 64 is less than the diameter of hole 16 and the internal diameter of flange 14. Thus, during initial installation, the filly assembled limitor 10 is brought to the tank and the float 64 is the first part of the limitor to be inserted into place. By first aligning float 64 axially with flange 14 and hole 16, float 64 may then be inserted down into the tank while the remaining structure consisting of the tube 18 and the cylinder 30 remain cocked at an angle above the flange 14. Once float 64 is lowered into the tank far enough to clear top wall 12 and flange 14, the limitor may be shifted laterally generally in the direction of the large open expanse on the top of float 64 until leg 72 is moved over into engagement or near engagement with the interior threads of flange 14. This utilization of the offset relationship between float 64 and operating leg 72 permits the lower end of cylinder 30 to come into registration with the internal diameter of flange 14, whereupon tube 18 and cylinder 30 may be manually rotated to become disposed into an upright orientation coaxial with flange 14 and hole 16. Although this disposes float 64 to a laterally outboard position relative to the outer limits of hole 16, this is of no consequence since float 64 is already well within the tank and no longer needs to pass through hole 16.

Consequently, allowing the cylinder 30 and the lower end of tube 18 to then slip down into flange 14 and partially through hole 16 brings the external threads 24 of tube 18 into contact with the internal threads of flange 14. The limitor 10 may then simply be screwed down into flange 14 using a wrench if necessary, although in many instances a manual manipulation is all that will be required. Float 64 merely rotates in a circle below top wall 12 as limitor 10 is screwed down into position. Once limitor is fully tightened down, it is ready for use.

Alternative Embodiments

FIGS. 8–14 are directed to a second embodiment of the invention wherein the limitor utilizes a drop tube as an extension to its lower end. As will be apparent to those skilled in the art, the limitor 110 of FIGS. 8–14 is identical in many respects to limitor 10, and therefore much of the construction of the limitor need not be repeated at this point. Where appropriate, common components between the two embodiments will be similarly numbered in the second embodiment, with the addition of the prefix "1".

As illustrated, a drop tube 186 projects downwardly from the lower end of the tubular body presented by the support tube 118 and the cylinder 130. In the preferred form of limitor 110, the upper end of the drop tube 186 is slipped onto and over the outside diameter of cylinder 130 until the upper end of drop tube 186 abuts the lower end of support tube 118. Although not shown, it will be understood that drop tube 186 may be secured to cylinder 130 by self-tapping screws or other fasteners. The upper end of drop tube 186 is appropriately slotted to clear the operating arm 166 of float 164 as drop tube 186 is installed onto cylinder 130.

Drop tube 186 must be attached to cylinder 130 before installation of limitor 110 onto the tank. Due to the length of drop tube 186, however, which extends far below float 164, it is not possible for the float 164 to be the lead component as limitor 110 is installed through flange 14 and hole 16 in top wall 12. Thus, the entire profile of limitor 110 below external threads 124 on the lower end of support tube 118 must be slender enough to pass axially through the internal diameter of flange 14 and hole 16. This is accomplished by providing a way for float 164 to be temporarily housed within the confines of drop tube 186 during installation.

In this regard, drop tube 186 is provided with a generally rectangular opening 188 in its sidewall directly adjacent float 164. Such opening 188 is taller and wider than float 164 which, as illustrated in the figures, is preferably semi-circular in transverse configuration rather than being cylindrical as is float 64. A cover 190 having height and width dimensions that exceed those of the opening 188 is located within the interior of drop tube 186 and normally lies up against and closes off opening 188 in overlapping relationship therewith. Cover 190 is preferably constructed of a plate-like spring metal with one end securely fastened to the wall of drop tube 186 by suitable fasteners such as rivets 192.

Figure 13:
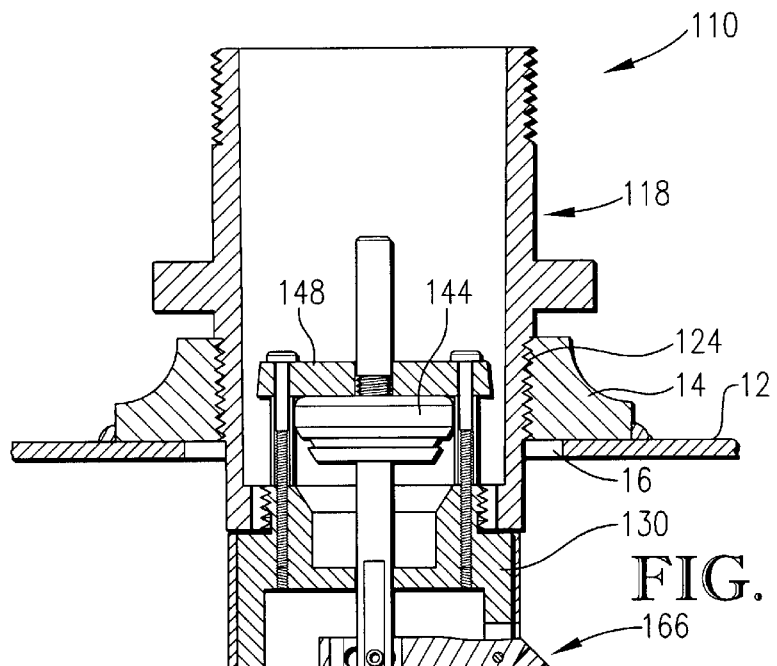
FIG. 13 is a fragmentary, vertical cross-sectional view of the drop tube embodiment showing the float in its valve open position.
Figure 14:
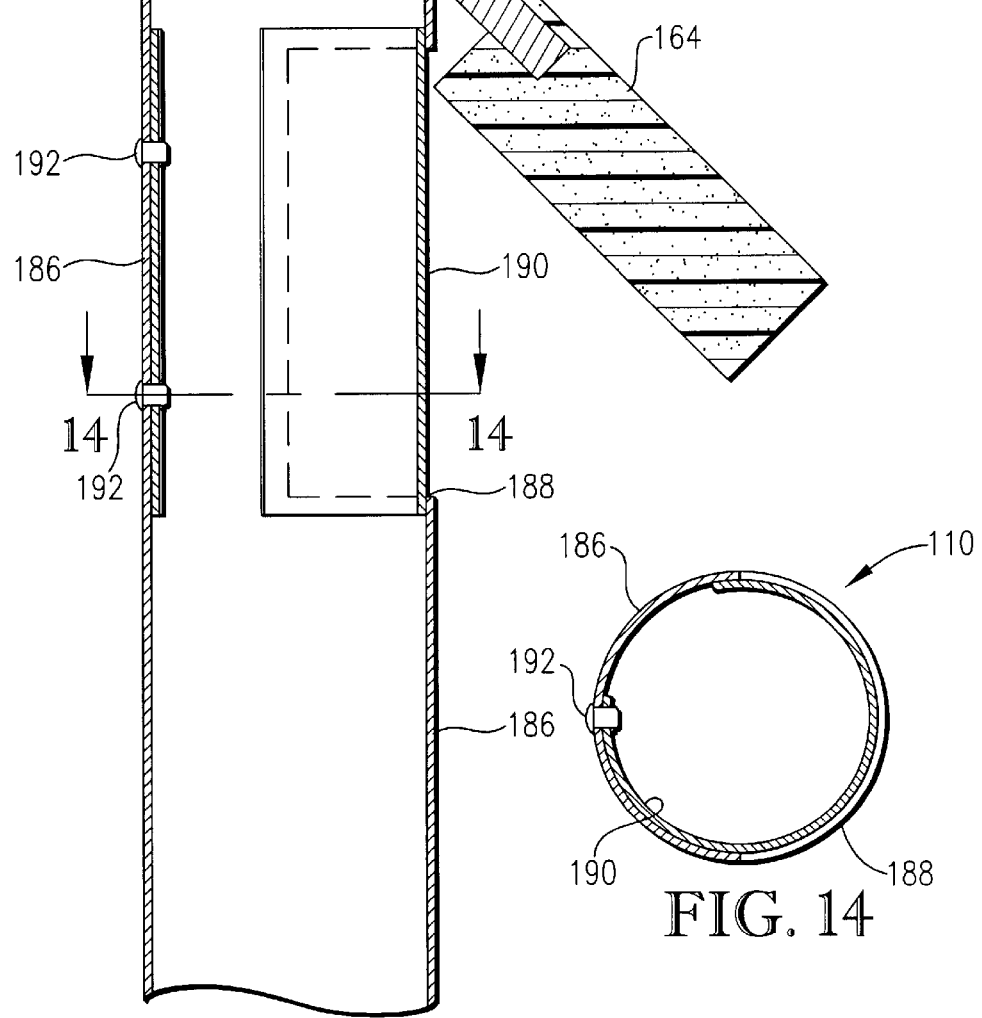
FIG. 14 is a horizontal cross sectional thereof taken substantially along line 14—14 of FIG. 13.

Operating arm 166 is constructed of a resilient material that is normally sufficiently stiff as to avoid bending and flexing during normal operation. As illustrated in FIG. 13, for example, operating arm 166 holds float 164 out at an angle to drop tube 186 when the weight of float 164 keeps the poppet 144 up against deflector 148 in the fully open position of FIG. 13. However, operating arm 166 is also sufficiently resilient as to allow flexure thereof as float 164 is manually pushed down beyond its valve open position of FIG. 13 into an installation position as illustrated in FIGS. 10–12 wherein float 164 has entered opening 188 and pushed spring-cover 190 back away from opening 188 and into a coiled up configuration. When float 164 is in this position, it presents no wider profile than the drop tube 186 itself, permitting axial insertion of the entire assembly through flange 14 and hole 16 during initial installation. Once float 164 has passed downwardly beyond flange 14 and top wall 12, it is free to spring back out to its valve open position of FIGS. 8 and 13.

FIGS. 15–18 are directed to a third embodiment of filling limitor denoted by the numeral 210. This embodiment is virtually identical to limitor 110, with the exception of details of construction of the float and its operating arm.

In this respect, it will again be noted that limitor 210 is provided with a drop tube 286 having an opening 288 provided with a spring cover 290. Once again, the intent is for float 264 to be placeable into opening 288 during installation so as to minimize the effective width of the overall assembly. However, instead of a resilient operating arm, float 264 is provided with a jointed operating arm 266.

In this construction, the outer leg 272 of operating arm 266 is subdivided into two sections 272a and 272b that are interconnected by a transverse connecting pin 292. A torsion spring 294 operably interconnects the two sections 272a and 272b and yieldably biases them toward their straight line orientation of FIG. 17, the construction of such sections being such that they interengage one another at the straight line configuration so as to prevent over travel past such position, although they can be pivoted relative to one another against the action of spring 294 in the opposite direction.

Accordingly, during installation, although float 264 would normally be disposed in its valve open position of FIG. 15 in which float 264 projects laterally outwardly from drop tube 286 for a substantial distance, float 264 maybe pushed down and around in a clockwise direction to enter opening 288 as jointed leg 272 pivots about pin 292 under the yieldable resistance of torsion spring 294. Once inside the tank, spring 294 returns float 264 to its proper valve open position.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the doctrine of equivalents to determine and assess the reasonably fair scope of his/their invention as pertains to any apparatus not materially departing from but outside the literal scope of the invention as set out in the following claims.

What is claimed is:

1. A filling limitor for a liquid storage tank comprising:
    an elongated tubular body adapted for attachment to the top wall of a tank,
    said body having an internal axial flow passage through which liquid is introduced into the tank and a port located within said passage;
    a poppet valve within said body for controlling whether the port is open or closed,
    said valve including a valve seat circumscribing the port and a poppet shiftable axially of the passage between a closed position in which the poppet is in sealing engagement with the seat and an open position in which the poppet is spaced from the seat;
    a float operably coupled with said poppet for shifting the poppet into its closed position when the liquid level within the tank rises to a certain level; and
    a deflector within the passage above the poppet to direct incoming liquid away from the poppet and thereby reduce the tendency of incoming liquid to shift the poppet to its closed position,
    said poppet and said deflector being centered with said passage,
    said deflector having a peripheral edge spaced radially inwardly from the body to define an annular region surrounding the deflector and through which liquid may flow to the port,
    said poppet having a guide stem projecting upwardly therefrom in the direction of said deflector,
    said deflector having a guide hole reciprocally receiving said stem.

2. A filling limitor as claimed in claim 1,
    said guide stem also projecting downwardly from the poppet away from said deflector and extending through the port, said body having a transverse guide bar extending across the passage below the port, said guide bar having a second guide hole in axial alignment with the guide hole in the deflector and reciprocally receiving the lower end of said guide stem.

3. A filling limitor as claimed in claim 2, said body having an operating arm pivotally secured thereto, said arm having an inner end coupled with the lower end of said guide stem inside the body and an outer end coupled with the float outside the body.

4. A filling limitor for a liquid storage tank comprising:

an elongated tubular body adapted for attachment to the top wall of a tank, said body having an internal axial flow passage through which liquid is introduced into the tank and a port located within said passage;

a poppet valve within said body for controlling whether the port is open or closed, said valve including a valve seat circumscribing the port and a poppet shiftable axially of the passage between a closed position in which the poppet is in sealing engagement with the seat and an open position in which the poppet is spaced from the seat;

a float operably coupled with said poppet for shifting the poppet into its closed position when the liquid level within the tank rises to a certain level; and a deflector within the passage above the poppet to direct incoming liquid away from the poppet and thereby reduce the tendency of incoming liquid to shift the poppet to its closed position, said body having a drop tube secured to the lower end thereof and projecting downwardly therefrom, said body having an operating arm pivotally secured thereto, said arm having an inner end coupled with the poppet inside the body and an outer end coupled with the float outside the body, said drop tube having a sidewall provided with an opening for temporarily receiving the float into the interior of the drop tube to reduce the width of the limitor for installation.

5. A filling limitor as claimed in claim 4, said drop tube having an internal spring-loaded cover yieldably biased into covering relationship with said opening, said cover being yieldable away from the opening under the urging of the float when the float is moved into the opening.

6. A filling limitor as claimed in claim 5, said arm being resilient to permit flexing thereof during movement of the float into the opening of the drop tube.

7. A filling limitor as claimed in claims 5, said arm being jointed intermediate its opposite ends to present a pair of relatively pivotable sections, said arm having a spring operably connected between the sections to yieldably bias the sections toward an operating position, said sections being pivotable relative to one another against the action of the spring to permit movement of the float into the opening of the drop tube when the poppet is at the limit of its stroke at said open position.

8. A filling limitor assembly for a liquid storage tank having an annular flange associated with a hole in the top wall of the tank, said assembly comprising:

an externally threaded mounting tube adapted to be inserted into said flange and threadably secured thereto in axial alignment with the hole; and a valve subassembly secured to the lower end of said mounting tube and supported thereby, said subassembly including a support cylinder having a central axis, a reduced diameter annular boss at an upper end of the cylinder coaxially received within and threadably engaged with the lower end of said mounting tube, said boss having a central port and a circular valve seat that circumscribes said port;

a valve stem coaxially supported within said cylinder for reciprocation along said axis;

a poppet secured to said stem for reciprocation therewith between a closed position in which the poppet is in sealing engagement with said seat and an open position in which the poppet is spaced axially from the seat;

an operating arm for said valve stem pivotally supported on the cylinder for up and down swinging movement, said arm having an inner end operably coupled with the lower end of said valve stem within the cylinder and an outer end located outside the cylinder;

a float secured to said outer end of the operating arm for shifting the poppet between its open and closed positions depending upon the level of liquid in the tank with which the limitor assembly is used; and a deflector supported by the cylinder in axial alignment with the poppet above the latter for directing incoming liquid away from the poppet, said tube having an annular, interior surface, said deflector having a peripheral edge spaced radially inwardly from said interior surface of the tube to define an annular region surrounding the deflector and through which liquid may flow to the port, said boss having a plurality of support members projecting upwardly therefrom to support said deflector.

9. A filling limitor assembly for a liquid storage tank having an annular flange associated with a hole in the top wall of the tank, said assembly comprising:

an externally threaded mounting tube adapted to be inserted into said flange and threadably secured thereto in axial alignment with the hole; and a valve subassembly secured to the lower end of said mounting tube and supported thereby, said subassembly including a support cylinder having a central axis, a reduced diameter annular boss at an upper end of the cylinder coaxially received within and threadably engaged with the lower end of said mounting tube, said boss having a central port and a circular valve seat that circumscribes said port;

a valve stem coaxially supported within said cylinder for reciprocation along said axis;

a poppet secured to said stem for reciprocation therewith between a closed position in which the poppet is in sealing engagement with said seat and an open position in which the poppet is spaced axially from the seat;

an operating arm for said valve stem pivotally supported on the cylinder for up and down swinging movement, said arm having an inner end operably coupled with the lower end of said valve stem within the cylinder and an outer end located outside the cylinder;

a float secured to said outer end of the operating arm for shifting the poppet between its open and closed positions depending upon the level of liquid in the tank with which the limitor assembly is used; and a deflector supported by the cylinder in axial alignment with the poppet above the latter for directing incoming liquid away from the poppet, said tube having an annular, interior surface, said deflector having a peripheral edge spaced radially inwardly from said interior surface of the tube to define an annular region surrounding the deflector and through which liquid may flow to the port, said deflector having a guide opening reciprocally receiving said stem above the poppet.

10. A filling limitor assembly as claimed in claim 9, said valve subassembly further including a transverse guide bar across said cylinder below said port, said guide bar having a guide opening reciprocally receiving said stem below the poppet.

* * * * *